No. 609,964. Patented Aug. 30, 1898.
E. HATHAWAY.
SADDLE SUPPORT FOR BICYCLES.
(Application filed Feb. 25, 1898.)
(No Model.)
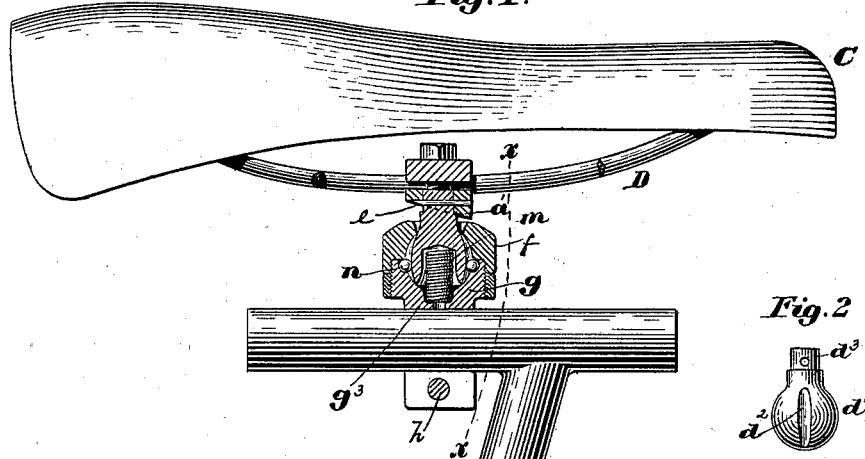
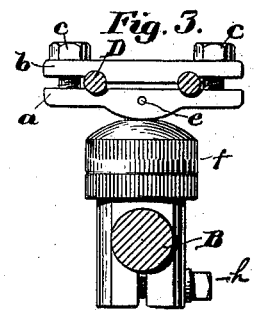
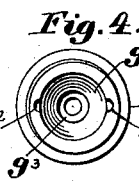
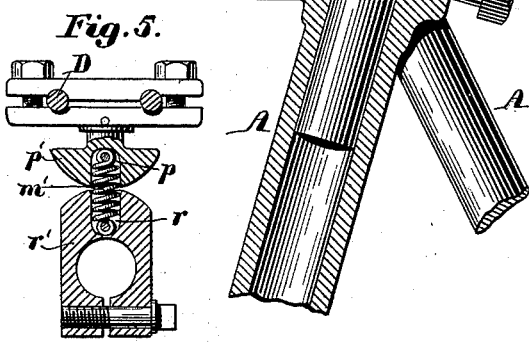
Witnesses:
Walter E. Lombard.
Edward F. Allen.
Inventor:
Edward Hathaway,
by Crosby & Gregory
Attys.

UNITED STATES PATENT OFFICE.

EDWARD HATHAWAY, OF MARBLEHEAD, MASSACHUSETTS.

SADDLE-SUPPORT FOR BICYCLES.

SPECIFICATION forming part of Letters Patent No. 609,964, dated August 30, 1898.

Application filed February 25, 1898. Serial No. 671,564. (No model.)

*To all whom it may concern:*

Be it known that I, EDWARD HATHAWAY, of Marblehead, county of Essex, State of Massachusetts, have invented an Improvement in Saddle-Supports for Bicycles, of which the following description, in connection with the accompanying drawings, is a specification, like letters on the drawings representing like parts.

This invention has for its object the production of a novel support for bicycle saddles or tops in order that the same may rock or tip to a limited extent, and thus reduce the jarring sensations due to shocks of traveling on the road.

In this my invention the clamp-plate carrying the clamp to engage the spring supporting the saddle-shaped top of the seat is provided with a spherical or ball-like stud which preferably enters a socket sustained on the ꓶ-pin, the socket being threaded to be engaged by a threaded union normally carried by the ball part and surrounding the same loosely. The ball is recessed to receive a spring which bottoms in the socket. Antifriction-balls are interposed between the ball and socket, and said balls entering suitable grooves or pockets in each prevent the rotation of the ball in the socket, but do not at all restrain the tipping of the ball in the socket.

Figure 1 is a partial sectional elevation of a sufficient portion of a bicycle-frame and ꓶ-pin with my improvements added. Fig. 2 is a detail showing the ball detached. Fig. 3 is a section in the line $x$, Fig. 1; and Fig. 4 is a top view of the socket. Fig. 5 is a central vertical section of a modification.

The bicycle-frame A, the ꓶ-pin B, the saddle or top C, and the two springs D, upon which the said saddle or top is secured, are and may be all of any usual or suitable construction.

This invention relates wholly to the means for supporting the springs of this saddle or top, means located wholly between the said spring and the ꓶ-pin.

The springs D are laid upon a plate $a$ in suitable grooves therein, and said springs are acted upon by a suitable clamp $b$ under the control of bolts $c$, so that said springs are held firmly and restrained against any motion except that due to their own elasticity.

The plate $a$ has an opening, as shown in Fig. 1, to receive the end $d$ of a stud having at one end the ball $d'$, said ball being preferably grooved at $d^2$, the stud end $d$ when fitted into the plate $a$ being restrained from rotation by any suitable device, as a screw or pin $e$. (See Fig. 1.) At its under side the plate $a$ is rounded and downwardly inclined toward the rear, as indicated at $a'$, so as to permit free tipping forward, but prevent further movement backward than desired.

The neck of the stud between the ball and the end $d$ is reduced and inserted through a hole in a union $f$ before the stud is fastened in the plate $a$, so that said union is left surrounding said stud and free to be rotated thereon, the opening in the top of the union being some little larger than the stud embraced by it, so that the stud has a chance to have a limited tipping movement in any and all directions, as required, to obviate the transmission of shocks which the bicycle may receive to the saddle or top. This union has a flange which is threaded at its inner side to engage suitable external screw-threads on a block $g$, having an eye to embrace the ꓶ-pin B, said block being split at its lower end and confined rigidly in position by means of a suitable set-screw $h$.

The block $g$ has a concaved opening or socket $g'$ in its top to receive the ball-like end of the stud referred to, and said socket has in it suitable pockets or grooves, as $g^2$, and the lower end of the socket is bored at $g^3$ to receive a spring $m$, which enters a bell-shaped hole in the lower end of the ball-like stud.

In the grooves $d^2$ and $g^2$, said grooves being in pairs, I place suitable antifriction-balls $n$, said balls aiding in the tipping of the ball in the socket, but obviating any rotation of the ball in the socket.

Prior to this invention I am aware that a saddle or top has been supported by a ball; but herein the ball and socket have a novel construction, whereby they operate perfectly, and the construction is durable and comparatively inexpensive.

A distinguishing feature of my invention resides in the spring $m$, which serves instantly to restore the saddle to its normal upright position whenever the saddle is tipped and the tipping pressure is removed. In other words, this spring as placed maintains the equilibrium of the saddle.

In Fig. 5 I have shown another means of employing this spring for accomplishing the same general movement, the spring being shown at $m$ inclosed in recesses $p\ r$, respectively, in a ball-like or hemispherical stud $p'$ and an opposite spheroidal-ended block $r'$, so that the stud rocks on the block in an obvious manner and is automatically restored to a normal position by the spring, the same as before.

Various other modifications may be resorted to within the spirit and scope of my invention.

Having fully described my invention, what I claim, and desire to secure by Letters Patent, is—

1. A seat-support, comprising a stud adapted to support a saddle, and a block for carrying the stud, said stud and block being shaped to permit rocking movement of the stud relatively to the block and each centrally provided in their meeting ends with a recess, a spring retained by and extending into both of said recesses for automatically centering and restoring the saddle to its normal position, and means holding said stud and block in engagement, substantially as described.

2. A seat-support, comprising a stud adapted to support a saddle, and having a ball-shaped lower end, and a block provided in its upper end with a socket to receive said ball-shaped end of the stud, the latter and said socket being centrally provided in their meeting ends with a recess, the recess of the stud being bell-shaped, a spring retained by and extending into both of said recesses for restoring the saddle to its normal position when tilted, and holding means retaining said stud in said socket, substantially as described.

3. As a seat-support between the spring of the seat and the ⊓-pin, a plate having a stud provided with a ball-shaped end bored for the reception of a spring, and a threaded union mounted loosely on a neck of said stud, combined with a socket shaped to receive the ball-shaped end of said stud and threaded to enable said union to be united to said socket to retain the ball seated in said socket, and a spring entering the opening of said ball and retained at the bottom of said socket, substantially as described.

4. A seat-support comprising a ball-and-socket joint, the ball thereof being provided with a vertical groove, the socket also having a vertical groove, and an antifriction-ball retained in and by said two vertical grooves for preventing horizontal rotation while permitting the rocking or tipping of the saddle, substantially as described.

5. A plate having extended from its lower side a stud provided with a ball-shaped end, and a reduced neck, said ball having a vertical groove; a saddle sustained by the upper side of said plate; and a threaded union applied loosely to the neck of said stud, and shaped to coact with a part of said ball-shaped end; and a threaded socket adapted to be sustained by the ⊓-pin, and provided with a seat for said ball, said seat having a vertical groove, combined with an antifriction-ball entering the vertical grooves of both the ball and the seat part of the socket, substantially as described.

In testimony whereof I have signed my name to this specification in the presence of two subscribing witnesses.

EDWARD HATHAWAY.

Witnesses:
JOHN COWPER EDWARDS,
AUGUSTA E. DEAN.